Feb. 20, 1962 L. E. FOGARTY 3,022,009
ANALOG COMPUTER FOR GENERATING A POWER
SERIES EXPANSION OF A FUNCTION
Filed March 11, 1957 3 Sheets-Sheet 1

INVENTOR

BY Darby & Darby
ATTORNEYS

INVENTOR

BY Darby & Darby

ATTORNEYS

INVENTOR

BY Darby & Darby
ATTORNEYS

United States Patent Office 3,022,009
Patented Feb. 20, 1962

3,022,009

ANALOG COMPUTER FOR GENERATING A POWER SERIES EXPANSION OF A FUNCTION

Laurence E. Fogarty, Binghamton, N.Y., assignor to General Precision, Inc., a corporation of Delaware Filed Mar. 11, 1957, Ser. No. 645,115
12 Claims. (Cl. 235—193)

Figure 1:
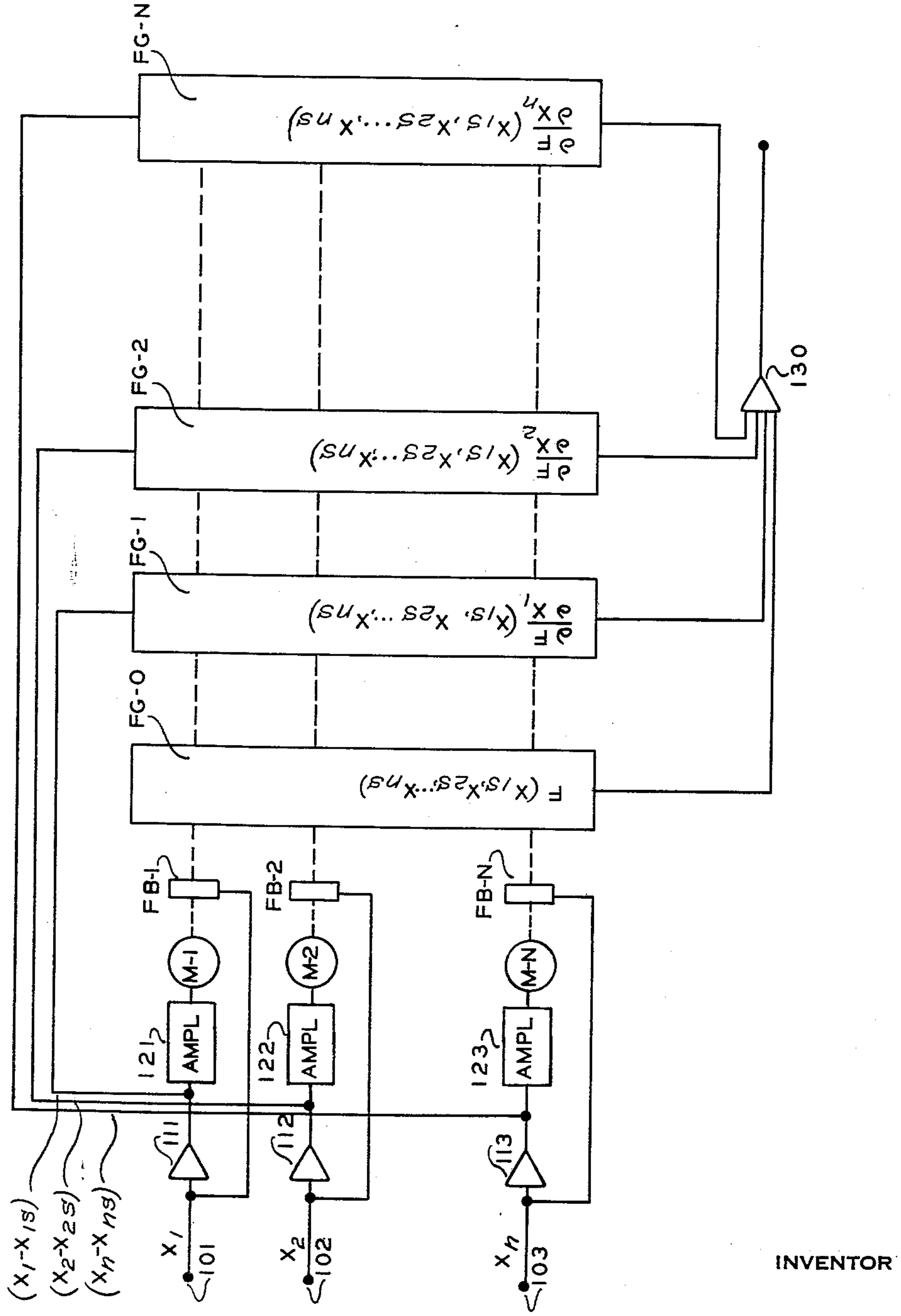

This invention relates to analog computer type of apparatus, and more particularly, to improved servo function generator apparatus. In the electrical arts generally, and particularly in the analog computer, automatic control and instrumentation arts, widespread use is made of servo multipliers and servo function generators. Such apparatus commonly comprises a means responsive to one or more computer input quantities which provides an output quantity commensurate with a specified mathematical or empirical function (often a highly non-linear function) of the input quantity or quantities. As a specific example, much electrical analog computation apparatus utilizes one or more servomechanisms to position the arms of variable potentiometers or the rotors of resolvers or variable transformer devices in accordance with the value of one or more independent variables in order to provide an output quantity, usually a voltage, commensurate in magnitude and polarity with the value of a specified function of said one or more independent variables. It is known that both position and velocity servomechanisms operate at various times with position or velocity lags or other errors, thereby causing functions derived by such servos to be in error at various times. While such errors may be neglected in certain applications, in others they may not, and some analog computer, automatic control and instrumentation apparatus comprises a plurality of interdependent and intricately interconnected servos, so that errors resulting from dynamic limitations of a first servomechanism may adversely affect the operation of further servos, sometimes causing considerable instability, hunting and computer inaccuracy. A need exists in the above-mentioned arts for servo function generators and multipliers which have minimum error due to servo lag.

This application is a continuation-in-part of my copending application Serial Number 628,136, filed December 13, 1956, for "Improved Servo Function Generator," which is assigned to the same assignee as the present invention. Broadly speaking, the instant case embodies a generalization of a principle common to the previous case, as will be made apparent as the description proceeds. Application Serial Number 628,136 illustrates in various embodiments how the response and accuracy of single-variable servo function generators and multipliers may be increased. Since numerous analog computation and simulation devices require the generation of functions of plural independent variables, it is desirable to provide generators of such functions which have improved dynamic response and accuracy.

Therefore, it is a primary object of the invention to provide improved servo function generation apparatus for providing an output quantity commensurate with a desired function of a plurality of independent variables.

It is a more specific object of the invention to provide servo function generation apparatus having improved dynamic accuracy for providing an output quantity in accordance with a desired arbitrary function of a plurality of independent variables.

It is a further object of the invention to provide improved apparatus of the above-described nature for providing an output quantity commensurate with the product of functions of a plurality of independent variable input quantities.

It is another object of the invention to provide improved apparatus of the above described nature for providing an output quantity commensurate with the product of a plurality of independent variable input quantities.

It is an additional object of the invention to provide apparatus of the type described in which further improvement may be obtained by inclusion of higher order corrective terms of a power series.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figure 2:
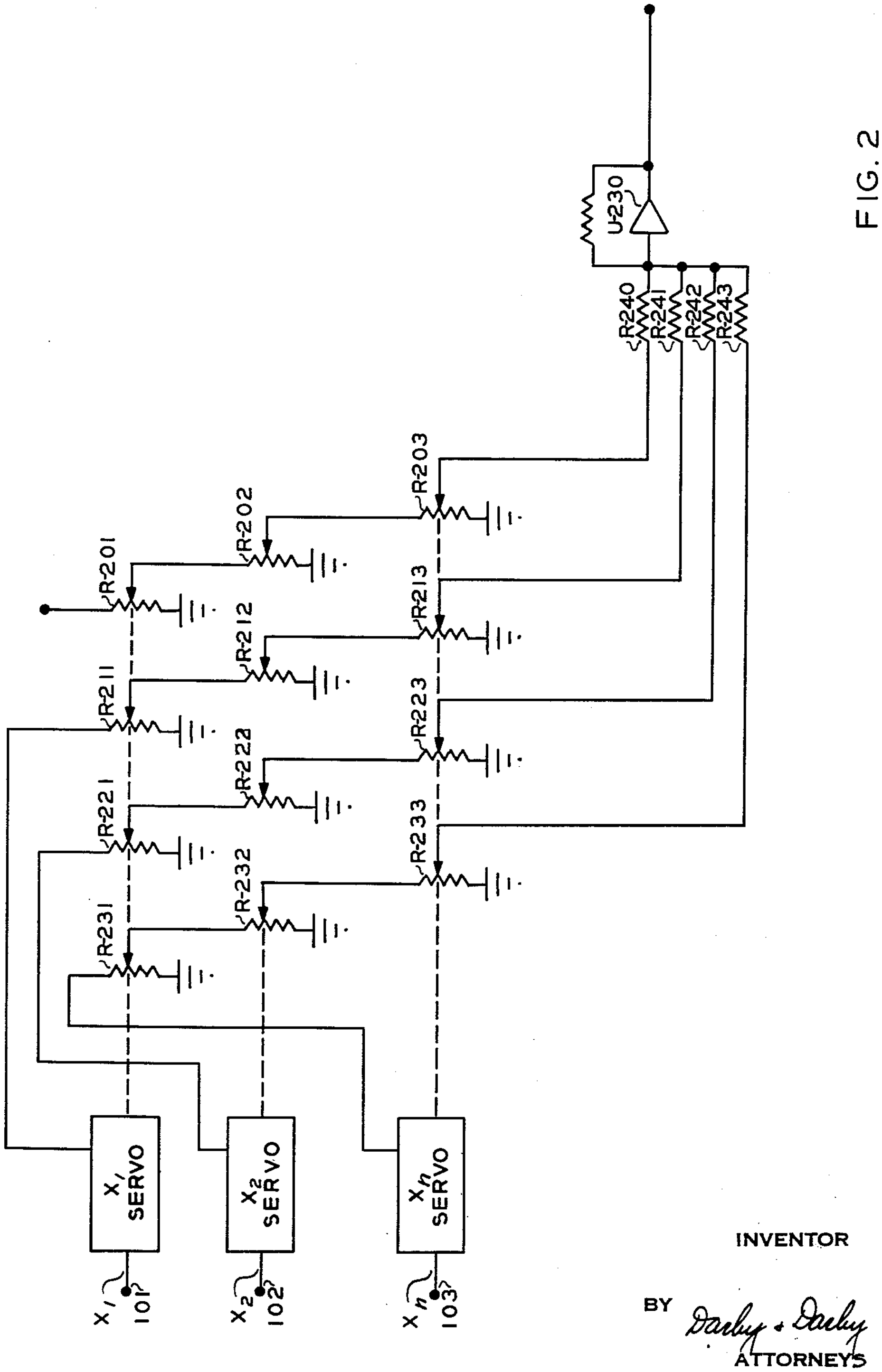
Figure 3:
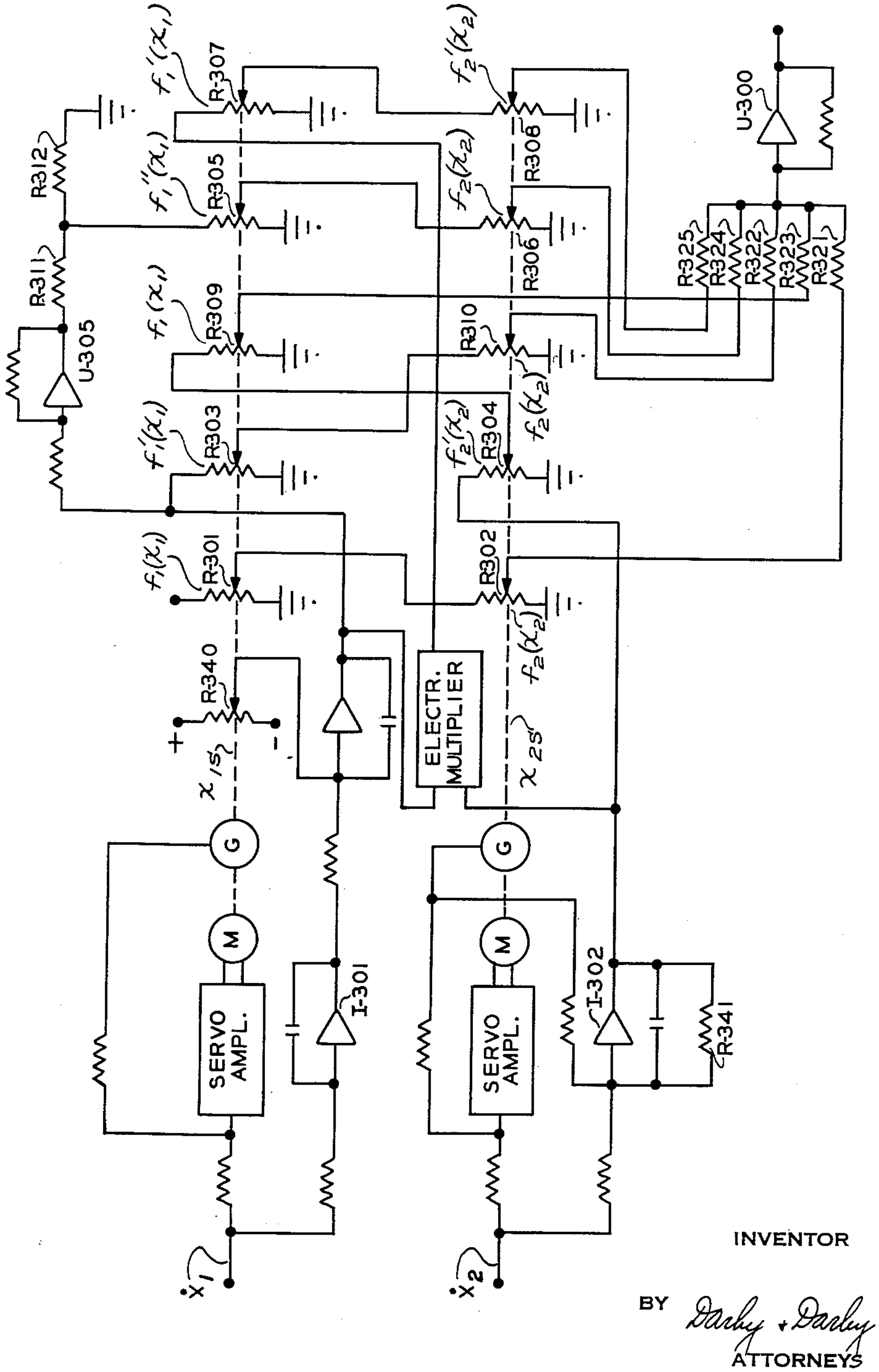

For a fuller understanding of the nature and objects of the invention, reference should be had to the following detailed description taken in connection with the accompanying drawings, in which:

FIG. 1 is an electrical schematic diagram partially in block form of an exemplary plural independent input variable function generator constructed in accordance with the invention, with which an output quantity commensurate with an arbitrary function of plural independent variables may be produced;

FIG. 2 is an electrical schematic diagram of a more specialized embodiment of the invention for providing an output quantity commensurate with the product of functions of plural independent variables, or an output quantity commensurate with the product of plural independent variables themselves. While FIGS. 1 and 2 illustrate apparatus for three independent input variables, it will become obvious that the invention applies to systems having any number of plural independent variables;

FIG. 3 is an electrical schematic diagram of an embodiment of the invention arranged to generate a function commensurate with the product of functions of two independent variables. FIG. 3 also illustrates how apparatus constructed in accordance with the invention may utilize velocity servos as well as position servos for function generation. In the figures, well-known parts are shown in block form or symbolically for sake of clarity.

FIG. 1 illustrates an exemplary embodiment of the generalized apparatus. Input signals commensurate with the instantaneous values of $n$ independent variables may be applied to terminals 101, 102, 103 and similar terminals not shown, a single input circuit being provided for each independent variable input quantity. Each input potential is compared with an internal potential in order to derive a potential substantially commensurate with a servo error signal. FIG. 1 contemplates generation of an output function which is a time proportional rather than time derivative or time integral function of the input independent variables, so ordinary position servos are shown in FIG. 1, a separate position servo being provided for each independent variable. Each position servo comprises a comparing means (111, 112 or 113) such as a summing circuit responsive to an input potential from terminal 101, 102 or 103 and a feedback potential to provide an error signal, which is applied to a conventional servo amplifier (121, 122 or 123) to drive a conventional servo motive means (M–1, M–2 or M–N). Feedback potentials are derived by feedback means (FB–1, FB–2, or FB–N) shown in block form, each of which may comprise, for example, a conventional follow-up potentiometer excited with a constant potential and positioned by its associated servo motive means. As described thus far, each of the position servos is completely conventional, may take a variety of forms and may include numerous known refinements.

Shown in block form in FIG. 1 as being connected to individual servo error signals and mechanically actuated by each of the servo output shafts are a plurality of function generator devices FG–1, FG–2 and FG–N, and a device FG–0 which is mechanically actuated by each servo output shaft but which is not connected to a servo error signal. If the desired output function is an arbitrary function of the output variables $x_1, x_2 \ldots x_n$, i.e., not a mere multiplication of the variables, each of the function generator devices shown may comprise, for example, a plural independent variable arbitrary function generator of the type shown in application Serial Number 452,681, now Patent No. 2,886,244, filed August 27, 1954, by John M. Hunt for "Function Generator" and assigned to the same assignee as the present invention. Alternatively, equivalent multi-variable arbitrary function generators may be used. If only two independent variables are provided, an arbitrary function generator of the general type shown in U.S. Patent Number 2,662,147 might be used, for example.

Assuming the feedback means of each of the position servos to be linear, it will be seen that from a steady-state viewpoint the output shaft positions of the servos will bear a constant relationship to the servo input quantities. The instantaneous shaft positions may be denoted by applying the subscripts to the respective servo input quantities. Thus the output shaft position $x_{1s}$ of servo M–1 will be commensurate with independent variable input $x_1$ during steady-state conditions, but during any transient condition shaft position $x_{1s}$ will lag behind $x_1$. The amount of this lag will be seen to be equal to the difference between $x$ and $x_s$, and it should be noted that the servo error signal is commensurate with this difference quantity in a simple linear servo.

In accordance with the invention, the operation of a feedback device which tends to seek a null or balanced condition may be considered to be operational over an interval of convergence of a power series, i.e., a Taylor series. Considering a function of $n$ variables, or $F(x_1, x_2, x_3 \ldots x_n)$, the first order Taylor expansion of this function about the point $x_{1s}, x_{2s}, x_{3s} \ldots x_{ns}$ is as follows:

$$F(x_1,x_2,x_3 \ldots x_n) \approx F(x_{1s},x_{2s}, \ldots x_{ns}) + \frac{\delta F}{\delta x_1}(x_{1s},x_{2s}, \ldots x_{ns})(x_1-x_{1s}) + \frac{\delta F}{\delta x_2}(x_{1s},x_{2s}, \ldots x_{ns})(x_2-x_{2s}) + \ldots + \frac{\delta F}{\delta x_n}(x_{1s},x_{2s}, \ldots x_{ns})(x_n-x_{ns}) \quad (1)$$

Considering the above expression, it may be deduced that each term is either available from servos connected to the independent variable input potentials or may readily be synthesized. The first term of the series comprises what the prior art has considered as the entire value of the function, and hence prior art function generating apparatus has been less accurate than the invention in an amount equal to the remaining terms of the power series. Each of the remaining terms of the power series may be seen to comprise the product of a partial derivative of the desired output function times a difference quantity. Since each difference quantity is available as the error signal of a servomechanism, each further term of the power series may be readily derived by modifying a particular servo error signal.

In FIG. 1, the initial term of the power series is derived by the function generator device FG–0 to provide an output quantity, which, as mentioned above, has been used by the prior art as the entire value of the function, but which in FIG. 1 is applied to a summing device 130, wihch device may comprise a conventional summing amplifier, for example. Each of the servo error quantities is applied (through a buffer or isolation means, not shown, if desired) to be modified by one of the function generator devices FG–1 through FG–N, to provide quantities commensurate with further terms of the power series. All of the quantities commensurate with terms of the series are combined by summing means 130 to provide the desired output function.

In the case of plural independent variables where it is desired to produce an output quantity which is not an extremely complex or arbitrary function of the various independent variables, but instead specifically the product of various functions of the independent variables, the function generator devices indicated by blocks FG–0, FG–1, etc. of FIG. 1 may be considerably simplified. Stated mathematically, if $$F(x_1,x_2, \ldots x_n = f_1(x_1)f_2(x_2) \ldots f_n(x_n)$$

the partial derivatives of general expression 1 may be written as follows:

$$\frac{\delta F}{\delta x_1} = \frac{df_1(x_{1s})}{dx_1} f_2(x_{2s}) f_3(x_{3s}) \ldots f_n(x_{ns})$$

$$\frac{\delta F}{\delta x_2} = \frac{df_2(x_{2s})}{dx_2} f_1(x_{1s}) f_3(x_{3s}) \ldots f_n(x_{ns}) \text{ to}$$

$$\frac{\delta F}{\delta x_n} = f_1(x_{1s}) \ldots f_{n-1}(x_{(n-1s)}) \frac{df_n(x_{ns})}{dx_n}$$

and the initial term of the series is $f(x_{1s})f(x_{2s})f(x_{3s}) \ldots f(x_{ns})$.

FIG. 2 illustrates a specific embodiment of the invention arranged to operate in accordance with the above relationships. A servo is provided for each independent variable just as in FIG. 1, and since the servos themselves may be conventional they need not be shown in detail in FIG. 2. Each servo shown in FIG. 2 provides an error quantity to excite a plurality of cascaded potentiometers, each group of cascaded potentiometers comprising a specific form of function generators device of the nature of those indicated in block form in FIG. 1. To provide the initial term of the power series, function generator device FG–0 of FIG. 1 may take the form shown in FIG. 2, comprising potentiometers R–201, R–202 and R–203. Potentiometer R–201 is excited by a constant potential from the computer power supply, and the potential on its wiper arm is modified by potentiometers R–202 and R–203, each of the three potentiometers being positioned by one of the servos. Potentiometers R–201, R–202 and R–203 have voltage versus shaft rotation characteristics in accordance with the respective values of the desired output function, namely, $f_1(x_{1s})$, $f_2(x_{2s})$ and $f_3(x_{3s})$. The output potential from R–203, which potential varies in accordance with the product of the functions of potentiometers on all $n$ servos, is applied to a summing device shown as comprising a conventional summing amplifier U–230 via summing resistor R–240. To provide the second term of the series, the error quantity of the $x_1$ servo is multiplied by cascaded potentiometers R–211, R–212 and R–213. Potentiometer group R–221, R–222, R–223 and potentiometer group R–231, R–232, R–233 multiply the error quantities from the $x_2$ servo and the $n$th independent variable servo to provide quantities commensurate with further terms of the power series, and such quantities are combined by summing means U–230 to provide the desired output potential.

Potentiometer R–211 is provided with a characteristic in accordance with $$\frac{\delta f_1}{\delta x_1}$$

potentiometer R–212 is provided with a $f_2(x_2)$ characteristic, and potentiometer R–213 is provided with a $f_n(x_n)$ characteristic. Similarly, potentiometer R–222 is provided with a $$\frac{\delta f_2}{\delta x_2}$$

characteristic, and potentiometers R–221 and R–223 are provided with $f_1(x_1)$ and $f_n(x_n)$ characteristics, respectively. Potentiometer R–233 is provided with a $$\frac{\delta f_n}{\delta x_n}$$

characteristic, and potentiometers R–231 and R–232 are provided with $f_1(x_1)$ and $f_2(x_2)$ characteristics, respectively. It will be seen that provision of such characteristics provides the first order terms of the power series.

An even more specialized case than that set forth above is the generation of the product of a plurality of independent variables themselves, rather than the product of functions of such variables, or as expressed mathematically, generation of $F(x_1, x_2, \ldots x_n)$ where the function equals the product $x_1x_2x_3x_4 \ldots x_n$. Apparatus such as that shown in FIG. 2 may be utilized, but all of the potentiometers shown will comprise linear potentiometers, and the potentiometers specified in FIG. 2 as having partial derivative characteristics may be eliminated and replaced by fixed resistances or jumper connections. Such alteration of the circuit of FIG. 2 may be seen to provide quantities in accordance with general expression 1 in which the partial derivative terms of expression 1 are simplified as follows:

$$\frac{\delta F}{\delta x_1}=x_2x_3 \ldots x_n \text{ to}$$

$$\frac{\delta F}{\delta x_n}=x_1x_2x_3 \ldots x_{n-1}$$

It should be understood that while expression 1 given above is written in general form, it includes only first order terms, and in specific function generating problems it may be desirable to provide one or more higher order terms of the Taylor expansion. Whether a particular higher order term should be included will depend in specific cases on the nature of the function to be generated, as will now be readily apparent to those skilled in the art. It is usually undesirable from a standpoint of economy and unnecessary for acceptable accuracy of most desired functions to include many or all second order terms.

The Taylor Series for two independent variables written to include second order terms is as follows:

$$f(x_1, x_2)=f(x_{1s}, x_{2s})+(x_1-x_{1s})\frac{\delta f}{\delta x_1}+(x_2-x_{2s})\frac{\delta f}{\delta x_2}+$$
$$\frac{1}{2!}\left\{(x_1-x_{1s})^2\frac{\delta^2 f}{\delta x_1}2+2(x_1-x_{1s})(x_2-x_{2s})\frac{\delta^2 f}{\delta x_1 x_2}+(x_2-x_{2s})^2\right.$$
$$\left.\frac{\delta^2 f}{\delta x_2}2\right\}+\ldots$$
$$+\frac{1}{n!}\left\{(x_1-x_{1s})^n\frac{\delta^n f}{\delta x_1^2}+n(x_1-x_{1s})^{n-1}(x_2-x_{2s})\frac{\delta^n f}{\delta x_1^{n-1}\delta x_2}+\right.$$
$$+\frac{n(n-1)}{2!}(x_1-x_{1s})^{n-2}(x_2-x_{2s})^2\frac{\delta^n f}{\delta x_1^{n-2}\delta x_2^2}+\ldots$$
$$\left.(x_2-x_{2s})^n\frac{\delta^n f}{\delta x_2^n}\right\} \qquad (2)$$

When written for functions of additional independent variables the series becomes somewhat lengthy. For example, with $n$ independent variables the second order term becomes:

$$\frac{1}{2!}\left\{(x_1-x_{1s})^2\frac{\delta^2 f}{\delta x^2}+2(x_1-x_{1s})(x_2-x_{2s})\frac{\delta^2 f}{\delta x_1\delta x_2}+\ldots\right.$$
$$+2(x_1-x_{1s})(x_n-x_{ns})\frac{\delta^2 f}{\delta x_1\delta x_n}$$
$$+2(x_2-x_{2s})(x_3-x_{3s})\frac{\delta^2 f}{\delta x_2\delta x_3}+\ldots$$
$$\ldots+2(x_2x_{2s})(x_n-x_{ns})\frac{\delta^2 f}{\delta x_s\delta x_n}+\ldots+$$
$$\left.+(x_n-x_{ns})^2\frac{\delta^2 f}{\delta x_n^2}\right\}$$

The general scheme for the second order term may be written symbolically as follows:

$$\frac{1}{2!}\left\{(x1-x_{1s})\frac{\delta}{\delta x_1}+(x_2-x_{2s})\frac{\delta}{\delta x_2}+\ldots(x_n-x_{ns})\frac{\delta}{\delta x_n}\right\}^2 f$$

In addition to second order terms, third and higher order terms may be included in those rather rare instances where they are of appreciable magnitude in desired output functions, and it should not be necessary to write further higher order terms in this application, since recourse may be had to standard calculus treatises for information on Taylor Series expansion. For example, see page 80 et seq., Vol. II of "Differential and Integral Calculus" by Courant.

FIG. 3 illustrates an exemplary two independent variable embodiment of the invention in which several second order terms are included in the output function for increased accuracy. FIG. 3 shows a system for generating a function in accordance with the product of functions of the two independent variables, or expressed symbolically:

$$f(x_1, x_2)=f_1(x_1)f_2(x_2)$$

The initial term of the series of expression 2 is provided by the potential derived by means of potentiometers R–301 and R–302, which potential is applied to summing means U–300 via summing resistor R–321. The second term of the series is derived from potentiometers R–303 and R–310 and applied to the summing means via resistor R–322. The winding of potentiometer R–303 is excited by the $x_1$ servo error quantity $(x_1-x_s)$ derived as will be explained below, and the arm of potentiometer R–303 is positioned by the output shaft of the $x_1$ variable servo. The third term of the series is derived in similar manner by use of the $x_2$ servo error quantity and potentiometers R–304 and R–309. Each of these terms thus described is a first order term. Potentiometers R–301 and R–302 are provided with $f_1(x_1)$ and $f_2(x_2)$ characteristics, respectively. Potentiometers R–303 and R–310 are provided with $$\frac{df_1(x_1)}{dx_1}$$

or $f_1'(x_1)$ and $f_2(x_2)$ characteristics, respectively. Potentiometers R–304 and R–309 are provided with $$\frac{df_2(x_2)}{dx_2}$$

or $f_2'(x_2)$ and $f_1(x_1)$ characteristics, respectively. The relationship of the generated second and third terms to corresponding terms of expression 2 may be seen from the following:

If $$f=f_1(x_1)\cdot f_2(x_2)$$

$$\frac{\delta f}{\delta x_2}=\frac{df_2(x_2)}{dx_2}f_1(x_1)$$

$$\frac{\delta f}{\delta x_1}=\frac{df_1(x_1)}{dx_1}f_2(x_2)$$

A second order term commensurate with the quantity $$\frac{1}{2!}\left\{(x_1-x_{1s})^2\frac{\delta f}{\delta x_1^2}\right\}$$

is derived by potentiometers R–305 and R–306. Since the function being generated is $f_1(x_1)f_2(x_2)$, the partial derivative $$\frac{\delta^2 f}{\delta x_1^2}$$

reduces to $$f_2(x_2)\frac{d^2 f_1(x_1)}{dx_1^2}$$

or, using prime notation $f_2(x_2)f''(x_1)$. Thus potentiometer R–305 is provided with a voltage versus shaft rotation characteristics in accordance with $f_1''(x_1)$ and potentiometer R–306 is provided with a $f_2(x_2)$ characteristic. Cascaded potentiometers R–305 and R–306 are excited by a voltage commensurate with the square of the $x_1$ servo error quantity, which "squared" voltage is derived by a conventional voltage squaring means shown as comprising buffer amplifier U–305 and resistances R–311 and R–312. R–312 comprises a non-linear resistor having a voltage versus resistance characteristic such that the potential at the junction between resistors R–311 and R–312 varies substantially as the square of the voltage at the output terminal of buffer amplifier U–305. The output voltage from potentiometer R–306 is applied to summing means U–300 via scaling resistor R–324, the latter resistor being selected as to take the factorial 2 constant into account. In similar manner a further squaring means (not shown) may be used to derive a voltage commensurate with $(x_2-x_{2s})^2$, the square of the error quantity of the $x_2$ independent variable servo. That voltage may be used to excite a further pair of cascaded potentiometers (not shown), the potentiometer driven by the $x_1$ servo shaft having a $f_1(x_1)$ characteristic, and the potentiometer driven by the $x_2$ servo shaft having a $f_2''(x_2)$ characteristic, so as to provide a further second order term for combination with the above described terms.

On rare occasions it may be deemed desirable to provide "cross-partial" terms, such as the second second-order term of expression 2. With relation to the assumed function $f=f_1(x_1)f_2(x_2)$, the partial derivative $$\frac{\delta^2 f}{\delta x_1 \delta x_2}$$

reduces to the following:

$$\frac{df_1(x_1)}{dx_1}\cdot\frac{df_2(x_2)}{dx_2}$$

or $f_1'(x_1)\cdot f_2'(x_2)$.

Therefore, to synthesize the $$(x_1-x_{1s})(x_2-x_{2s})\frac{{}^2f}{x_1x_2}$$

term of the series, potentiometers R–307 and R–308 are provided. Potentiometer R–307 is positioned by the $x_1$ servo shaft and provided with a $f_1'(x_1)$ characteristic. Potentiometer R–308 is positioned by the $x_2$ servo shaft and provided with a $f_2'(x_2)$ characteristic. Potentiometers R–307 and R–308 are cascaded as shown and the output of voltage from the arm of potentiometer R–308 is applied to combining means U–300 via scaling resistor R–325. To properly synthesize the term, cascaded potentiometers such as R–307 and R–308 should be excited by a voltage which varies in accordance with the product of the servo error quantities, or $(x_1-x_{1s})(x_2-x_{2s})$. The two servo error quantities are shown as being applied to the input terminals of an electronic multiplier which provides an output potential commensurate with their product. The electronic multiplier shown in block form may comprise any one of a number of well-known electronic multipliers, such as a "time division" multiplier, or a torque balancing multiplier. It is desirable to avoid synthesis of such cross partial terms, since the use of electronic multipliers considerably increases the cost and decreases the reliability of the apparatus, and fortunately, in most practical function generating problems the magnitudes of the cross-partial terms are so small that they may be neglected with insignificant decrease in accuracy. In view of the above explanation of FIG. 3, application of the invention to functions of additional variables and the inclusion of higher order terms should be apparent to those skilled in the art.

While FIGS. 1 and 2 assume that the servo error quantities are derived from the error-deriving or comparer means of a position servo, it should be noted that various other arrangements may be employed with any of the embodiments of the invention, a number of alternative arrangements being illustrated in detail in application Serial Number 628,136. For example, the internal error signal which is amplified to drive a servo motive means may not be precisely commensurate with the difference between servo input quantity and servo output quantity due to the use of rate of feedback or lag or lead networks, so it may be desirable to provide a separate summing means to compare servo input and output to derive an error quantity. Furthermore, any or all of the servos used in accordance with the invention may comprise velocity or integrating servos, and the error quantities utilized in accordance with this invention for providing Taylor series terms may be derived, for example, by either of the techniques disclosed in the velocity servo embodiments of application Serial Number 628,136. Briefly described, one system of deriving the error quantity comprises comparing the output quantity of a velocity servo with the output quantity of an electronic integrator which is responsive to the same input signal as the velocity servo, and a further means for deriving the error quantity comprises electronic integration of the velocity servo loop error signal. These two arrangements are exemplified in FIG. 3, wherein the $x_1$ and $x_2$ independent variable shafts comprise the mechanical output rotation of velocity or integrating servos rather than position servos. In FIG. 3 an $\dot{x}_1$ potential commensurate with the time rate of change of the variable $x_1$ is applied to operate a conventional velocity servo, thereby deriving a potential on the arm of potentiometer R–340 which differs from the time integral of $\dot{x}_1$ by an amount depending upon the lag of the velocity servo. The $\dot{x}_1$ potential is also integrated with respect to time by electronic integrator I–301, which integrator has no appreciable velocity lag, thereby deriving an output potential which may be considered precisely commensurate with the variable $x_1$. The potential from potentiometer R–340 and the output potential from integrator I–301 are compared by means of summing amplifier U–302, thereby providing an output potential commensurate with the $x_1$ servo lag.

The $x_2$ servo of FIG. 3 also comprises a conventional velocity servo. A potential commensurate with $\dot{x}_2$, the time rate of change of the $x_2$ independent variable, is applied to the $x_2$ servo, which provides an output shaft position $x_{2s}$. The $\dot{x}_2$ input signal applied to the $x_2$ servo and the rate feedback or $\dot{x}_{2s}$ signal from tachometer generator G of the $x_2$ servo are compared and integrated with respect to time by electronic integrator I–302, thereby deriving an output potential commensurate with the $x_2$ servo position lag. A resistance R–341 may be connected to discharge integrator I–302 at a desired rate, so that the output voltage of integrator I–302 will decay to zero when no input signal is being applied to the $x_2$ servo, as is explained in more detail in my above-mentioned copending application.

It should be noted that in the generation of a number of functions, various terms of the power series may be of limited magnitude so that they need not be synthesized. Also, in certain cases various derivative terms may be constants, or substantially constants, so that various of the potentiometers shown may be replaced by fixed resistances without departing from the invention. A number of well-known techniques may be employed to provide desired voltage-rotation characteristics for the potentiometers used. These techniques may include the use of shunting or "padding" resistances, the use of varying potentiometer resistance card widths, the use of fixed taps connected to give non-linear potential distribution, the use of non-linear mechanical actuating means, and various other well-known techniques. Various other voltage modifying means may be used in place of potentiometers where desired.

The invention is applicable to either direct or alternating current function generation. If velocity servos are utilized as shown in FIG. 3, direct voltage input signals are required in order to operate the electronic integrators. Either series or parallel summing may be used in any embodiment of the invention. For sake of clarity a number of buffer amplifiers and polarity-inversion amplifiers have been omitted from the drawings, and those skilled in the art will have no trouble inserting such details where necessary. For sake of clarity and convenience of explanation systems for generating single polarity output functions have been illustrated, but those skilled in the art will readily recognize that functions which go both positive and negative with respect to ground may be generated in accordance with the invention merely by connecting the various function potentiometers to be excited at their end terminals by voltages of opposite polarity.

It may be noted in FIG. 3 that several potentiometers having the same characteristic are operated by the same shaft, and that the output potentials from such potentiometers are applied directly to the output summing device. In such cases, a savings in equipment cost sometimes may be effected by using a single potentiometer. For example, in FIG. 3 since the specific function desired, $f_1(x_1) \cdot f_2(x_2)$, has been illustrated, potentiometers R–301, R–302 and R–310 will have the same voltage versus shaft rotation characteristic. Therefore, if desired, the voltages applied to excite these potentiometers may be combined by summing means (not shown) and their sum utilized to excite a single potentiometer. Obviously the correct polarity relationship between the voltages applied to summing means U–300 must be maintained. The savings in potentiometers which may be effected by this technique varies widely with the nature of the desired output function.

While the schematic diagrams shown in this application imply the use of electrical motor servomechanisms, various other servomechanisms may readily be substituted, including, for example, hydraulic or pneumatic servomechanisms. The nature of the input signals applied to various types of servomechanisms varies widely, as do the feedback quantities, so the summing means used with such servomechanisms may take a variety of forms, providing servo error quantities in the form of a shaft position, a pressure or some other physical parameter instead of an electrical potential. Well known transducers may be utilized as necessary in accordance with well known techniques to convert input quantities, feedback quantities and error quantities without departing from this invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Analog computer function generating apparatus comprising in combination, a plurality of servomechanisms each responsive to a computer input quantity commensurate with an independent variable and each operable to provide a steady-state output position commensurate with the value of its associated independent variable, a plurality of function generators operated by said servomechanisms to provide a plurality of output quantities, at least one of said function generators providing an output quantity which is commensurate with the difference between the instantaneous and the steady-state output positions of one of said servomechanisms as modified in accordance with the instantaneous output positions of at least two of said servomechanisms, each of said output quantities being commensurate with the value of a different term of a Taylor series which expresses the value of a desired output function, and means combining said output quantities to provide a further output quantity.

2. Analog computer function generating apparatus for providing a desired output quantity of a desired function of $n$ independent variables comprising in combination, a plurality of servomechanisms each individually responsive to a different computer input quantity commensurate with the value of one of said $n$ independent variables and each of said servomechanisms being operable at steady state to provide a mechanical output position commensurate with the value of its associated independent variable, means for deriving a plurality of error quantities, each of said error quantities being commensurate with the difference between the instantaneous position and the steady-state position of one of said servomechanisms, a first function generator responsive to the mechanical output positions of said servomechanisms for deriving a first output quantity, $n$ further function generators, each operated by said servomechanisms and each operable to modify one of said error quantities to provide a further output quantity, at least one of said further function generators being operated by more than one of said $n$ servomechanisms, and means combining said first output quantity and the further output quantities to provide said desired output quantity.

3. Apparatus according to claim 2 in which said computer input quantities and said desired output quantity comprises electrical potentials.

4. Apparatus according to claim 2 in which the steady-state mechanical output position of each of said servomechanisms is proportional to its respective computer input quantity.

5. Apparatus according to claim 2 in which the steady-state mechanical output position of each of said servomechanisms is commensurate with the time integral of its respective computer input quantity.

6. Function generation apparatus for providing a desired output quantity in accordance with the product of specified functions of $n$ independent variables comprising in combination $n$ servomechanisms, each of said servomechanisms being responsive to an individual input potential commensurate with one of said independent variables and each of said servomechanisms being operable to provide a mechanical output position commensurate at steady-state with its associated independent variable, $n$ voltage modifying means, each of said voltage modifying means being operable by one of said servomechanisms and having a characteristic in accordance with one of said specified functions, a potential source, means for interconnecting said voltage modifying means and said source to provide a first output potential, commensurate with the instantaneous position of said desired output quantity, means for deriving $n$ error quantities, each of said error quantities being commensurate with the difference between the instantaneous position and the steady-state position of a different one of said servomechanisms, means for modifying at least one of said error quantities in accordance with the first derivative of the specified function associated with the particular servomechanism from which said one of said error quantities is derived and for further modifying said error quantity in accordance with said instantaneous positions of at least two of said $n$ servomechanisms, and summing means responsive to said first output potential and to each of said modified error quantities for providing said desired output quantity.

7. Function generations apparatus for providing a desired output quantity which varies in accordance with the product of first and second specified functions of first and second independent variables, comprising in combination, first and second servomechanisms responsive respectively to first and second input potentials and operative respectively to provide respectively first and second mechanical output positions commensurate at steady-state with said first and second independent variables, first and second modifying means mechanically operated by said first and second servomechanisms respectively and having output versus input characteristics in accordance with said specified functions for providing a first output quantity, means for deriving first and second error quantities commensurate with the difference between the instantaneous and steady-state positions of said first and second servomechanisms respectively, a third modifying means mechanically operated by said first and said second servomechanism and having a characteristic in accordance with the first partial derivative of said product of said first and second specified functions with respect to said first independent variable for modifying said first error quantity to provide a second output quantity, and summing means responsive to said first and second output quantities to provide said desired output quantity.

8. Apparatus according to claim 7 in which at least one of said servomechanisms comprises a position servomechanism responsive to an input potential which is proportional to one of said independent variables.

9. Apparatus according to claim 7 in which at least one of said servomechanisms comprises an integrating servomechanism responsive to an input potential which is commensurate with the time rate of change of one of said independent variables.

10. Apparatus according to claim 7 having a fourth modifying means operated by at least said first servomechanism and having a characteristic in accordance with the first partial derivative of said product of said first and second specified functions with respect to said second independent variable for modifying said second error quantity to provide a further output quantity, said further output quantity being combined by said summing means with said first and second output quantities to provide said desired output quantity.

11. Apparatus according to claim 7 having means for squaring said first error quantity to provide an error squared quantity, a fifth modifying means mechanically operated by at least said second servomechanism and having a characteristic in accordance with the second partial derivative of said product of said first and second specified functions with respect to said first independent variable for modifying said error squared quantity to provide a further output quantity, said further output quantity being combined by said summing means with said first and second output quantities to provide said desired output quantity.

12. Apparatus according to claim 7 having means for deriving the product of said first and second error quantities to provide an error product quantity, a sixth modifying means operated by at least one of said servomechanisms and having a characterisic in accordance with the second partial derivative of said product of said first and second specified functions with respect to said first and second independent variable for modifying said error product quantity to provide a further output quantity, said further output quantity being combined by said summing means with said first and second output quantities to provide said desired output quantity.

References Cited in the file of this patent

UNITED STATES PATENTS

| | | |
|---|---|---|
| 2,781,967 | Spencer et al. | Feb. 19, 1957 |
| 2,894,685 | Spencer et al. | July 14, 1959 |

FOREIGN PATENTS

| | | |
|---|---|---|
| 883,989 | France | Apr. 12, 1943 |
| 1,062,270 | France | Dec. 2, 1953 |
| 765,788 | Great Britain | Jan. 16, 1957 |